(12) United States Patent
Liu et al.

(10) Patent No.: US 11,522,400 B2
(45) Date of Patent: Dec. 6, 2022

(54) FAULT-TOLERANT MODULAR PERMANENT MAGNET ASSISTED SYNCHRONOUS RELUCTANCE MOTOR AND MODULAR WINDING DESIGN METHOD

(71) Applicant: JIANGSU UNIVERSITY, Zhenjiang (CN)

(72) Inventors: Guohai Liu, Zhenjiang (CN); Meimei Xu, Zhenjiang (CN); Wenxiang Zhao, Zhenjiang (CN); Jinghua Ji, Zhenjiang (CN); Qian Chen, Zhenjiang (CN); Zhijian Ling, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 426 days.

(21) Appl. No.: 16/487,021

(22) PCT Filed: Jan. 4, 2019

(86) PCT No.: PCT/CN2019/070323
§ 371 (c)(1),
(2) Date: Aug. 19, 2019

(87) PCT Pub. No.: WO2019/205733
PCT Pub. Date: Oct. 31, 2019

(65) Prior Publication Data
US 2021/0359565 A1 Nov. 18, 2021

(30) Foreign Application Priority Data

Apr. 27, 2018 (CN) .......................... 201810390721.6
Apr. 27, 2018 (CN) .......................... 201810390860.9

(51) Int. Cl.
*H02K 3/28* (2006.01)
*H02K 1/27* (2022.01)
*H02K 1/276* (2022.01)

(52) U.S. Cl.
CPC ............... *H02K 3/28* (2013.01); *H02K 1/276* (2013.01); *H02K 2201/06* (2013.01)

(58) Field of Classification Search
CPC ....... H02K 3/28; H02K 1/276; H02K 2201/06
See application file for complete search history.

(56) References Cited

U.S. PATENT DOCUMENTS

| 2009/0224624 A1* | 9/2009 | Kumar ................... H02K 1/276 |
| | | 310/156.53 |
| 2013/0147299 A1* | 6/2013 | Rahman ............... H02K 1/2766 |
| | | 310/156.01 |

(Continued)

FOREIGN PATENT DOCUMENTS

| CN | 105356704 A | 2/2016 |
| CN | 106787284 A | 5/2017 |

(Continued)

OTHER PUBLICATIONS

Bo Wang et al.; A General Modelling Technique for a Triple Redundant 3x3-phase PMA SynRM; IEEE Transactions on Industrial Electronics; Dec. 28, 2017.

*Primary Examiner* — Thomas Truong
(74) *Attorney, Agent, or Firm* — Heslin Rothenberg Farley & Mesiti, P.C.

(57) ABSTRACT

The present invention relates to a fault-tolerant modular permanent magnet assisted synchronous reluctance motor (PMaSynRM) and provides a modular winding connection method. The modular winding connection is to change the positions of inlet and outlet coils based on the slot electrical potential star vectogram. Then, each module has a separate set of winding and the left and right relative distribution will be adopted on the winding connection. The invention has the advantages of modularization in structure, high independence between the modules, effectively avoiding overlapping of magnetic lines between the modules, and improving (Continued)

fault tolerance and reliability of the motor. The invention has the advantages of modularization in structure, high independence between the modules, magnetic decoupling between the modules, and improvement of fault tolerance and reliability of the motor.

8 Claims, 5 Drawing Sheets

(56) References Cited

U.S. PATENT DOCUMENTS

| | | | | |
|---|---|---|---|---|
| 2013/0207498 A1* | 8/2013 | Kusase | ............... | H02K 1/27 310/156.01 |
| 2015/0295456 A1* | 10/2015 | Michaelides | ........ | H02K 41/031 310/156.01 |
| 2018/0109155 A1* | 4/2018 | Munoz | ............... | H02K 3/30 |

FOREIGN PATENT DOCUMENTS

| | | | |
|---|---|---|---|
| CN | 106877607 | A | 6/2017 |
| CN | 108448753 | A | 8/2018 |
| CN | 108448774 | A | 8/2018 |
| EP | 2136455 | A1 | 12/2009 |

* cited by examiner

FAULT-TOLERANT MODULAR PERMANENT MAGNET ASSISTED SYNCHRONOUS RELUCTANCE MOTOR AND MODULAR WINDING DESIGN METHOD

CROSS REFERENCE TO RELATED APPLICATIONS

This application is a U.S. National Phase filing under 35 U.S.C. § 371 of International Application PCT/CN2019/070323, filed Jan. 4, 2019. PCT/CN2019/070323 claims priority from Chinese Patent Application Number 201810390721.6, filed Apr. 27, 2018 and Chinese Patent Application Number 201810390860.9, filed Apr. 27, 2018. The entire contents of each of these applications are hereby expressly incorporated herein by reference.

FIELD OF THE INVENTION

The present invention relates to a method of improving fault-tolerance performance for permanent magnet assisted synchronous reluctance motors (PMaSynRMs) with distributed winding by using a modular winding design, which belongs to the field of PMaSynRMs.

BACKGROUND OF THE INVENTION

As a key component of electric vehicles, the motor drive system is directly related to the dynamic performance and conversion efficiency of electric vehicles. The conventional interior permanent magnet motor (IPM) with distributed winding has attracted increasing attention in electric vehicles due to its high efficiency, high power density and so on. However, the cost of the IPM will increase greatly due to the use of expensive rare earth materials such as NdFeB. Moreover, rare earth materials are easily demagnetized in high temperature which leads to the failure of the motor drive system operate. It may limit the application of IPMS motors in electric vehicles. PMaSynRM is a special IPMS motor and its permanent magnet is used to improve the power factor. Hence, the above-mentioned problems can be effectively solved by using ferrite magnets with weak magnetic and low cost in the PMaSynRMs.

In addition, for electric vehicles, the reliability and safety of the motor drive system are critical. Nevertheless, the traditional three-phase PMaSynRM with the distributed winding will cause phase-to-phase magnetic circuit coupling. The electrical torque will drop sharply and accompany the severe vibration when the winding is an open or shorted circuit. Hence, the traditional three-phase PMaSynRM with the distributed winding is not fault-tolerant and could even threaten the safety of people inside the vehicle under fault condition.

In the past two years, the importance of improving the fault-tolerant performance of PMaSynRM with the distributed winding has been paid attention by Professor J. B. Wang of the University of Sheffield, UK. The fault-tolerance PMaSynRM with the distributed winding has been proposed in IEEE Transactions on Industrial Electronics, DOI: 10.1109/TIE.2018.2793229 (A general modelling technique for a triple redundant 3×3-phase PMaSynRM). The fault-tolerant PMaSynRM obtains three independent three-phase windings by changing the winding connection to achieve physical isolation, magnetic isolation and thermal isolation between each set of windings. The proposed PMaSynRM solves the shortcomings of its own poor fault-tolerant performance in the distributed winding permanent magnet motor, but the coupling between the modules still exists. Therefore, how to achieve the high fault-tolerance performance of PMaSynRM with distributed winding has practical significance.

SUMMARY OF THE INVENTION

The present invention seeks to overcome the disadvantages of poor fault-tolerant performance in the PMaSynRM with distributed winding. To this end, the present invention proposed a modular winding design method in PMaSynRM with distributed winding and can achieve effective decoupling between the modules.

In order to achieve the hereinabove effects, the technical solutions of the present invention are:

The fault-tolerant modular PMaSynRM of an embodiment includes a modular stator (1) and an asymmet-ric rotor (2). The modular stator (1) includes stator iron core (1-1), armature windings (3), non-magnetic conductors (4) and a plurality of teeth and slots in the circumferential direction. Each module is formed by two non-magnetic conductors (4) distributed along the circumference. Moreover, slots closest to both sides of the non-magnetic conductor (4) are shifting circumferentially away from the non-magnetic conductor (4). The rotor includes rotor iron core (2-1), flux barriers (2) and permanent magnets (6). Flux barrier angles are different in each pole and the flux barrier angles of adjacent poles are also different. In addition, the permanent magnets (6) are inserted in the flux barriers and the N poles and the S poles of the permanent magnets adjacent in the circumferential direction are alternately arranged.

Further, each modular is connected by a separate three-phase distributed winding, which may be a single layer or a double layer.

Then, slots closest to both sides of the non-magnetic conductor (4) have different shifting angles, and the remaining slots have the same slot spacing. By the way, slots closest to both sides of the non-magnetic conductor (4) can be named slot a (1-2) and slot b (1-3).

When the number of rotor poles pair p is an odd number and the flux barrier angle β of any modular is selected as the reference, the clockwise flux barrier angles along the reference module are $$\beta+\theta, \beta+2\theta \ldots \beta+\frac{n-1}{2}\theta,$$

the counterclockwise flux barrier angles along with the reference module:

$$\beta+\theta, \beta+2\theta \ldots \beta-\frac{n-1}{2}\theta,$$

p=n. Similarly, the clockwise flux barrier angles along the reference module are $$\beta+\theta, \beta+2\theta \ldots \beta+\left(\frac{n}{2}-1\right)\theta, \beta, \beta-\theta, \beta-2\theta \ldots \beta-\left(\frac{n}{2}-1\right)\theta,$$

p=n, when the number of rotor poles pair p is an even number.

In addition, the shifting angles of slot a (1-2) and slot b (1-3) are θ1 and θ2. The specific values of θ1 and θ2 can be set to 2.2 degrees and 2 degrees, respectively.

A method for a modular winding design in the fault-tolerant modular PMaSynRM comprises the following steps:

Step 1: The fault-tolerant modular PMaSynRM needs to be designed and it includes a modular stator (1) and an asymmetric rotor (2). The modular stator (1) includes stator iron core (1-1), armature windings (3), non-magnetic conductors (4) and a plurality of teeth and slots in the circumferential direction. Each module is formed by two non-magnetic conductors (4) distributed along the circumference. Moreover, slots closest to both sides of the non-magnetic conductor (4) are shifting circumferentially away from the non-magnetic conductor (4). The rotor includes rotor iron core (2-1), flux barriers (5) and permanent magnets (6). Flux barrier angles are different in each pole and the flux barrier angles of adjacent poles are also different. In addition, the permanent magnets (6) are inserted in the flux barriers and the N poles and the S poles of the permanent magnets adjacent in the circumferential direction are alter-nately arranged.

Step 2: Selecting the appropriate number of modules according to the numbers of slots and poles of the PMaSynRM with distributed winding. Moreover, the number of stator slots contained in each module is greater than or equal to 2 m, m≥3.

Step 3: Splitting the windings based on the slot electrical potential star vectogram. Moreover, each module is guaranteed to have an independent set of windings and the set of windings only uses stator slots in the same module. In order not to change the winding factor of the motor, the winding pitch is the same as the conventional connection and the left and right relative distribution will be adopted on the winding connection.

Step 4: In order to realize the modular design of the motor stator, the non-magnetic conductors (4) are inserted between the modules to achieve isolation.

Further, each modular is connected by a separate three-phase distributed winding, which may be a single layer or a double layer.

Then, the integer slot distributed winding is adopted in the PMaSynRM, and the relationship of slot and pole satisfies q=S/(2*p*m) and q is an integer, wherein S is the number of stator slots, and p is the number of pole pairs, m≥3.

Besides, each modular adopts three-phase windings for star connection.

When the number of rotor poles pair p is an odd number and the flux barrier angle β of any modular is selected as the reference, the clockwise flux barrier angles along the reference module are $$\beta + \theta, \beta + 2\theta \ldots \beta + \frac{n-1}{2}\theta,$$

the counterclockwise flux barrier angles along with the reference module:

$$\beta + \theta, \beta + 2\theta \ldots \beta - \frac{n-1}{2}\theta,$$

p=n. Similarly, the clockwise flux barrier angles along the reference module are $$\beta + \theta, \beta + 2\theta \ldots \beta + \left(\frac{n}{2} - 1\right)\theta, \beta, \beta - \theta, \beta - 2\theta \ldots \beta - \left(\frac{n}{2} - 1\right)\theta,$$

p=n, when the number of rotor poles pair p is an even number.

The present invention has the following effects:
1. The modular stator is adopted in the present invention. Hence, the structure of the PMaSynRM achieved modularity because of the non-continuous stator and the insertion of the non-magnetic conductor.
2. High independence between the modules effectively avoids overlapping flux lines and improves reliability.
3. Each module has independent three-phase windings which are driven by standard three-phase inverters under normal operation. Moreover, multiple modules can work in coordination and ensure safe operation under fault condition.
4. Each stator module has controlled by independent winding. Hence, a fault-tolerant operation can be achieved by removing the faulty winding.
5. The design of the modular, non-continuous stator structure reduces the coupling between the modules. Meanwhile, it will cause distortion of the flux lines which passes through the stator and increase the torque ripple. Therefore, the asymmetric design of the stator and rotor is proposed to reduce the torque ripple. It mainly makes the torque ripple generated by each module cancel each other out.
6. The torque ripple can be further eliminated and the fault tolerance of the motor can also be further improved after shifting slots closest to both sides of the non-magnetic conductor.
7. Modular design makes assembly easy and mass production with low-price.

BRIEF DESCRIPTION OF THE DRAWINGS

The invention will be explained in greater detail with reference to the accompanying drawings, wherein.

In the figure, 1: Stator; 2: Rotor; 3: Armature winding; 4: Non-magnetic conductor; 5: Flux barrier; 6: Permanent magnet; 2-1: Rotor core; 2-2: Flux barrier M2; 2-3: Flux barrier M3; 2-4: Flux barrier M1.

DETAILED DESCRIPTION OF THE INVENTION

Figure 1:
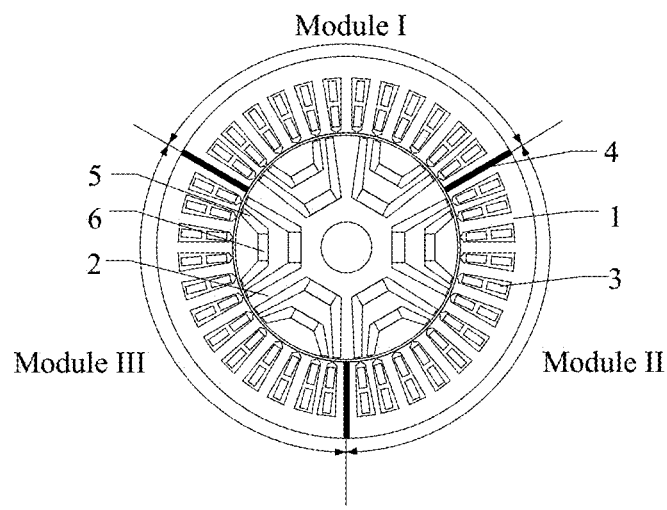
FIG. 1 is a schematic view in cross-section of the module PMaSynRM according to the invention.
Figure 2:
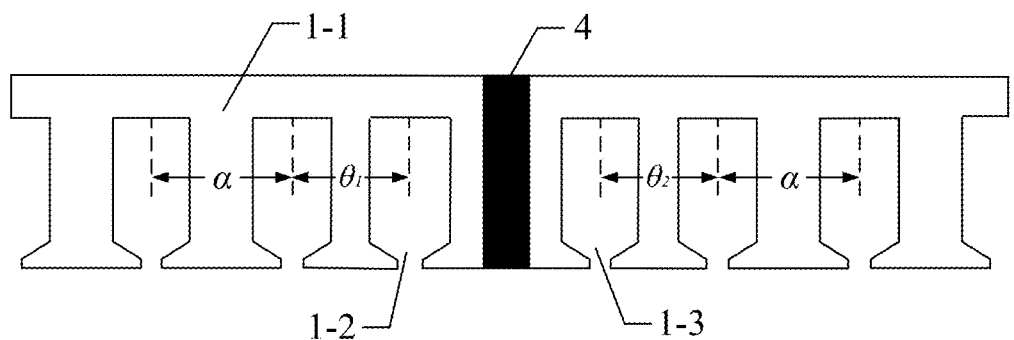
FIG. 2 is a schematic view in cross-section of the stator of the module PMaSynRM.

The proposed fault-tolerant modular PMaSynRM and its modular winding connection method will be described in detail referring to the following figure. FIG. 1 is an example of a PMaSynRM of the present invention. As shown in FIG. 1, the fault-tolerant modular PMaSynRM includes a modular stator (1), an asymmetric rotor (2), armature windings (3), non-magnetic conductors (4), flux barriers (5) and permanent magnets (6). In FIG. 2, the modular stator (1) includes stator iron core (1-1), armature windings (3), non-magnetic conductors (4) and a plurality of teeth and slots in the circumferential direction. Moreover, slots (1-2) and (1-3) closest to both sides of the nonmagnetic conductor (4) are shifting circumferentially away from the non-magnetic conductor (4). The rotor includes rotor iron core (2-1), flux barriers (5) and permanent magnets (6) in FIG. 3. In addition, the permanent magnets (6) are inserted in the flux barriers and the N poles and the S poles of the permanent magnets adjacent in the circumferential direction are alternately arranged. As shown in FIG. 4, each modular is connected by a separate three-phase distributed winding and the left and right relative distribution will be adopted on the winding connection. Hence, the isolation between the modules will be implemented to improve the fault-tolerant in the PMaSynRM.

The above-mentioned flux barrier 5 includes a flux barrier M22-2 in Module II, a flux barrier M32-3 in Module III and a flux barrier M12-4 in Module I.

In the illustration above, the stator consists of three modules, each module contains 12 stator slots. The rotor consists of six double-layer U-shaped flux barriers with ferrite material inserted. Each module is isolated by two non-magnetic conductors (4) distributed along the circumference.

A method for a modular winding design in the fault-tolerant modular PMaSynRM comprises the following steps:

Step 1: The fault-tolerant modular PMaSynRM needs to be designed and it includes a modular stator (1) and an asymmetric rotor (2). The modular stator (1) includes stator iron core (1-1), armature windings (3), non-magnetic conductors (4) and a plurality of teeth and slots in the circumferential direction. Each module is formed by two non-magnetic conductors (4) distributed along the circumference. Moreover, slots closest to both sides of the nonmagnetic conductor (4) are shifting circumferentially away from the non-magnetic conductor (4). The rotor includes rotor iron core (2-1), flux barriers (5) and permanent magnets (6). Flux barrier angles are different in each pole and the flux barrier angles of adjacent poles are also different. In addition, the permanent magnets (6) are inserted in the flux barriers and the N poles and the S poles of the permanent magnets adjacent in the circumferential direction are alternately arranged.

Step 2: Selecting the appropriate number of module unit according to the numbers of slots and poles of the PMaSynRM with distributed winding. Moreover, the number of stator slots contained in each module is greater than or equal to 2 m, m≥3.

Step 3: Splitting the windings based on the slot electrical potential star vectogram. Moreover, each module is guaranteed to have an independent set of windings and the set of windings only uses stator slots in the same module. In order not to change the winding factor of the motor, the winding pitch is the same as the conventional connection.

Step 4: In order to realize the modular design of the motor stator, the non-magnetic conductors (4) are inserted between the modules to achieve isolation.

Figure 3:
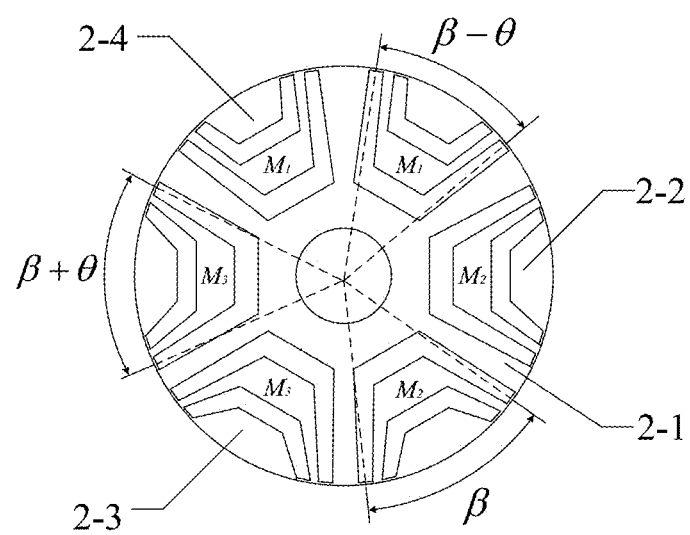
FIG. 3 is a schematic view in cross-section of the rotor of the module PMaSynRM.
Figure 4:
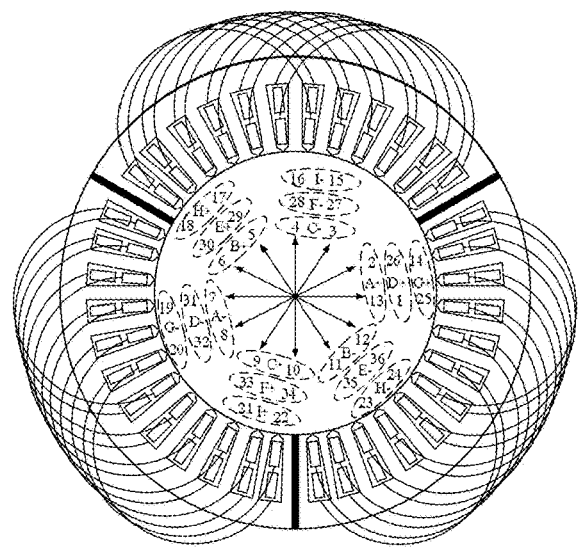
FIG. 4 is a modular winding connection method according to the invention.

As shown in FIG. 3, the motor includes rotor iron core 2-1 and flux barrier 5 which contains flux barrier M22-2 in the Module II, a flux barrier M32-3 in the Module III and a flux barrier M12-4 in the Module I. When the number of rotor poles pair p is an odd number and the flux barrier angle β of any modular is selected as the reference, the clockwise flux barrier angles along the reference module are:

$$\beta + \theta, \beta + 2\theta \ldots \beta + \frac{n-1}{2}\theta,$$

the counterclockwise flux barrier angles along with the reference module:

$$\beta + \theta, \beta + 2\theta \ldots \beta - \frac{n-1}{2}\theta,$$

p=n. Similarly, the clockwise flux barrier angles along the reference module are $$\beta + \theta, \beta + 2\theta \ldots \beta + \left(\frac{n}{2}-1\right)\theta, \beta, \beta - \theta, \beta - 2\theta \ldots \beta - \left(\frac{n}{2}-1\right)\theta,$$

p=n, when the number of rotor poles pair p is an even number. The motor is composed of n-module (n≥3), and a non-conductive magnet (4) is disposed between adjacent modules.

Figure 5:
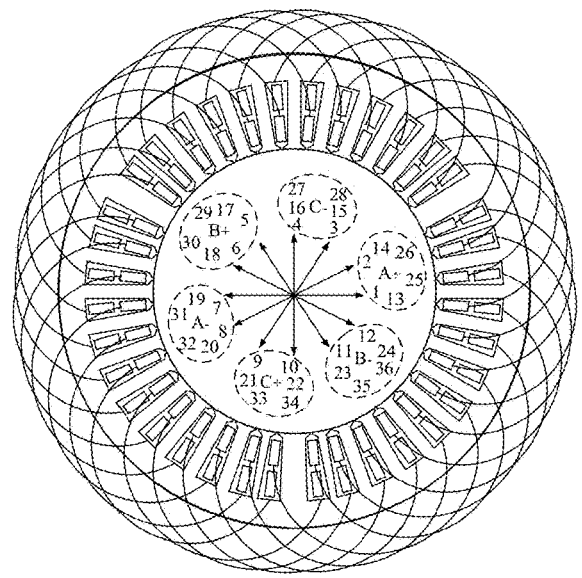
FIG. 5 is a conventional winding connection method of PMaSynRM.
Figure 6:
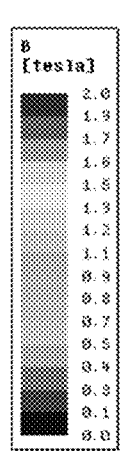
FIG. 6 is a flux density distribution of conventional PMaSynRM under the faulty set winding is disconnected.
Figure 6:
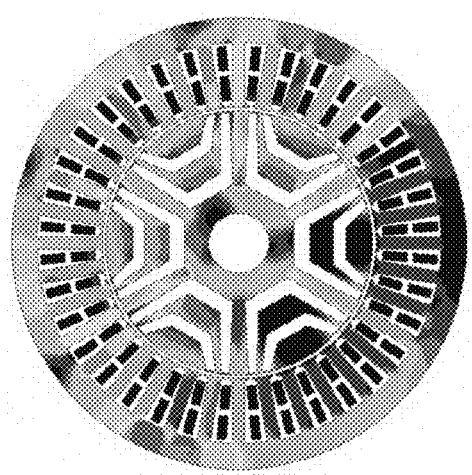

The connection of the windings is usually chosen to be a single layer or a double layer winding. The coil pitch of the double winding is adjustable compared with the single layer. Hence, appropriate short pitch factor can be used to weaken back electromotive force (EMF) harmonics and improve the electromagnetic performance of the motor. In order to further illustrate the method of the present invention, a PMaSynRM with the modular winding connection is compared with a convention PMaSynRM motor. FIG. 5 shows the cross section of PMaSynRM with the conventional winding connection. FIG. 6 shows a flux density distribution of conventional PMaSynRM under the faulty set winding is disconnected. The magnetic circuits are coupled to each other due to the traditional distributed winding connection. Therefore, it has a large impact on other phases even if the fault occurs on one phase.

Figure 7:
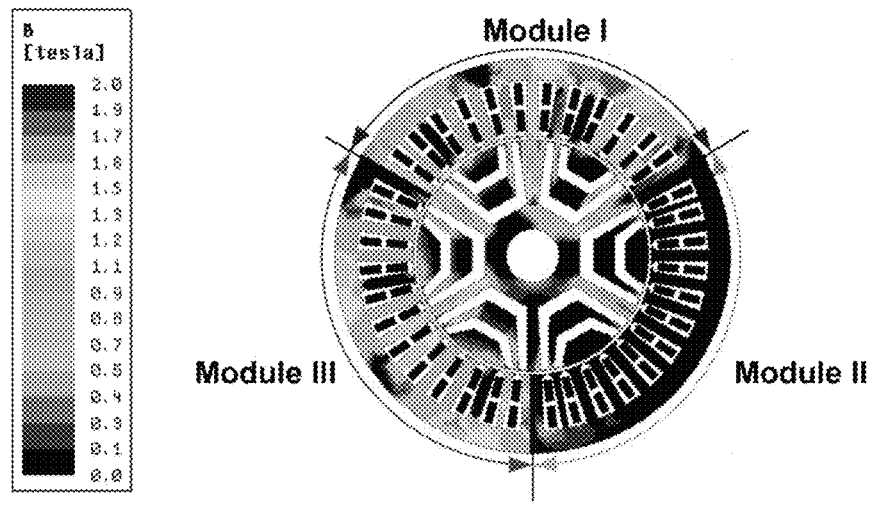
FIG. 7 is a flux density distribution of proposed modular PMaSynRM under module II fault conditions.

FIG. 7 shows a flux density distribution of proposed modular PMaSynRM under module II fault conditions. It can be seen that Module I and Module III are basically unaffected when Module II has failed. Moreover, Module I and Module III can still maintain normal operation due to the design of modular stator and the connection of modular independent winding.

Figure 8:
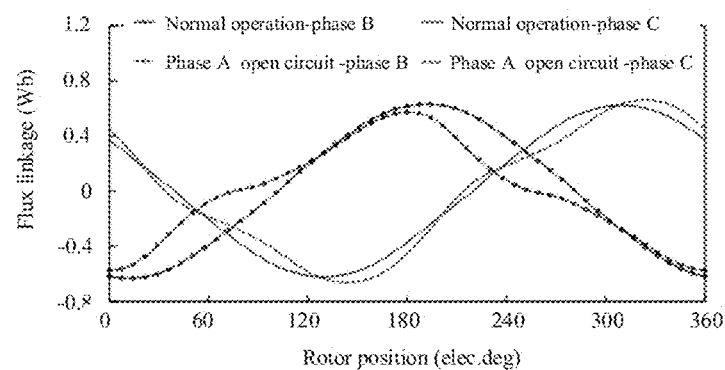
FIG. 8 is the linkage waveforms of the phase B and phase C of conventional PMaSynRM under health condition and A phase open circuited.
Figure 9:
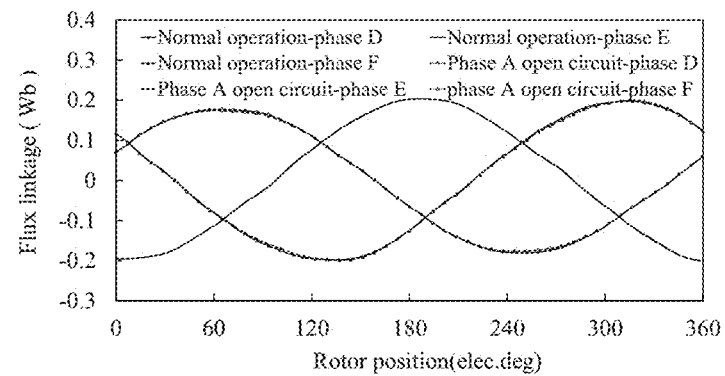
FIG. 9 is the linkage waveforms of the phase B and phase C of proposed PMaSynRM under health condition and A phase open circuited.

FIG. 8 and FIG. 9 show the linkage waveforms of the phase B and phase C of conventional and proposed PMaSynRM under health condition and A phase open circuited, respectively. As shown in FIG. 8, the flux linkages of the phase B and phase C are distorted and the phase-to-phase coupling is large when the A phase is open circuit fault. However, the flux linkages of module I and module III in the proposed PMaSynRM are still consistent with the normal operation when module II is open circuit fault in FIG. 9. That is to say that the magnetic circuits between the modules are relatively independent and realize the decoupling between the modules.

Figure 10:
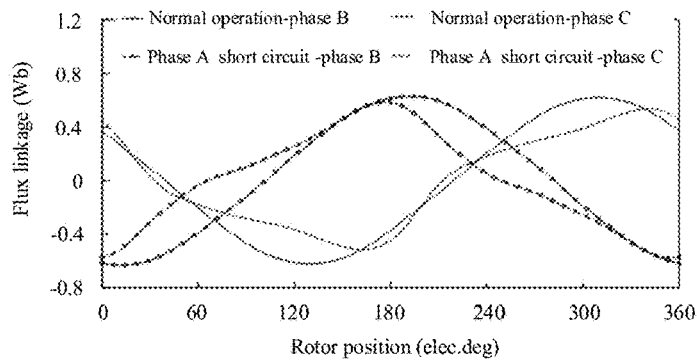
FIG. 10 is the linkage waveforms of phase B and phase C of conventional PMaSynRM under health condition and A phase short-circuited.
Figure 11:
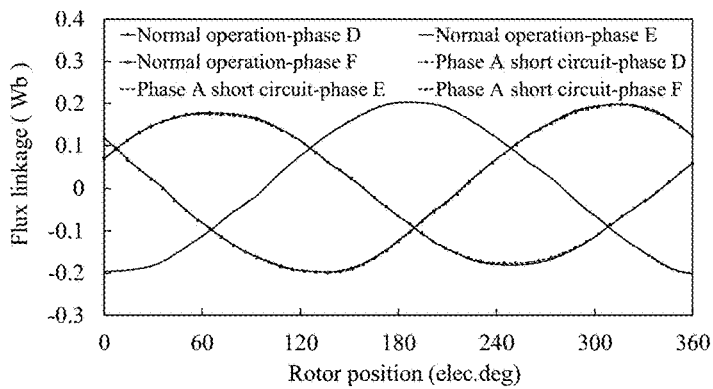
FIG. 11 is the linkage waveforms of the phase B and phase C of proposed PMaSynRM under health condition and A phase short-circuited.

FIG. 10 and FIG. 11 show the linkage waveforms of phase B and phase C of conventional and proposed PMaSynRM under health condition and A phase short-circuited, respectively. As shown in FIG. 10, the phase-to-phase influence of the PMaSynRM with a conventional winding is large when A phase short-circuited, which similar to open circuit failure.

FIG. 11 shows that the PMaSynRM with a modular distribution winding proposed by the present invention has almost no influence between the flux linkages in the event of a short circuit fault. It verifies the PMaSynRM achieves independence between modules and improves the fault tolerance performance by adopting the method of highly fault-tolerant modular winding connection proposed by the present invention.

Figure 12:
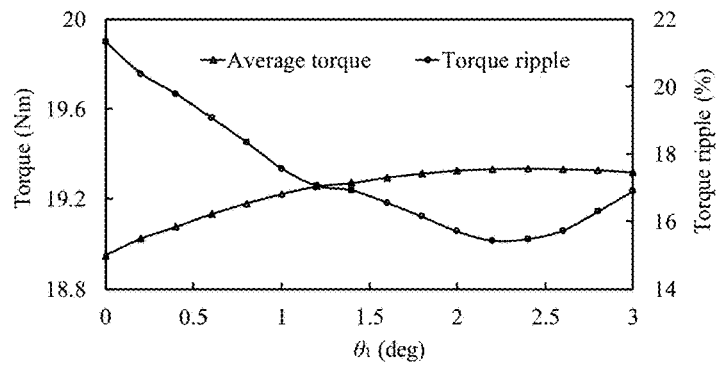
FIG. 12 is the average torque and torque ripple under different $\theta_1$.
Figure 13:
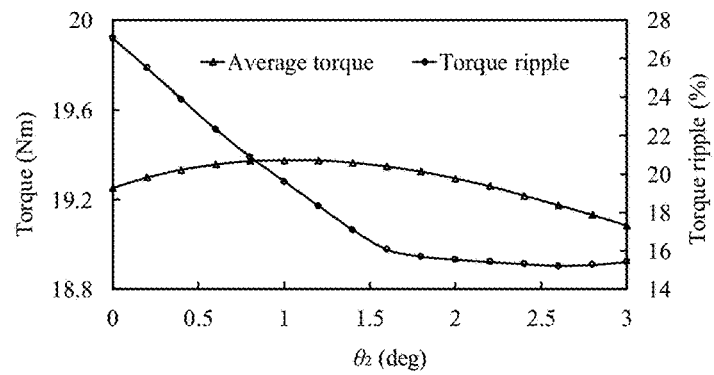
FIG. 13 is the average torque and torque ripple under different $\theta_2$.

FIG. 12 and FIG. 13 show the average torque and torque ripple under different θ1 and θ2. Moreover, slots closest to both sides of the non-magnetic conductor (4) have different shifting angles, and the remaining slots have the same slot spacing (as shown in FIG. 2). As shown in FIG. 12, the average torque increase when the θ1 increases from 0 to 2.5, nevertheless, the average torque slightly decreased when the θ1 increases from 2.5 to 3. Besides, the torque ripple decrease when the θ1 increases from 0 to 2.2, nevertheless, the torque ripple increases when the θ1 increases from 2.2 to 3. The θ1 can be selected as 2.2 by considering the average torque and torque ripple simultaneously. Similarly, the average torque increase when the θ2 increases from 0 to 1.2, nevertheless, the average torque decreased when the θ2 increases from 1.2 to 3. Besides, the torque ripple decreases when the θ2 increases from 0 to 2.6, nevertheless, the torque ripple increases when the θ1 increases from 2.6 to 3. Hence, the θ2 is chosen as 2.

Figure 14:
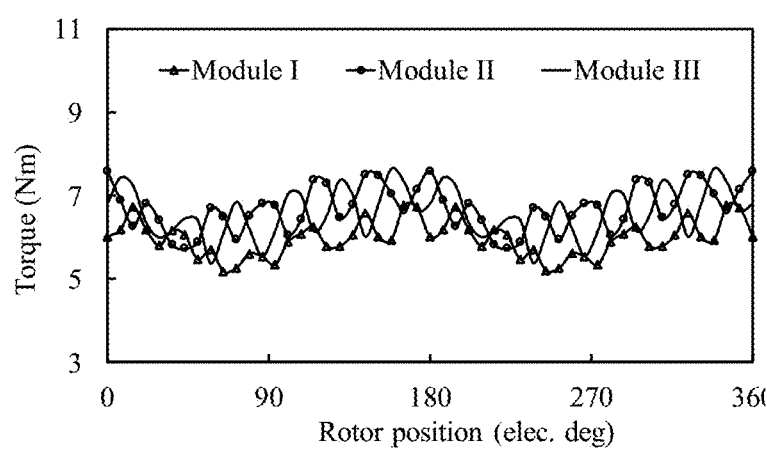
FIG. 14 is the torque waveform of each module of the proposed PMaSynRM.

FIG. 14 shows the torque waveform of each module of the proposed PMaSynRM. The torque generated by each module has a certain phase difference because the flux barrier angle of each module is different (θ≠0). Furthermore, the torque ripple of each module cancels each other and hence the torque ripple is effectively suppressed.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A fault-tolerant modular permanent magnet assisted synchronous reluctance motor (PMaSynRM) comprising a modular stator and an asymmetric rotor, wherein
the modular stator includes a stator iron core, armature windings, non-magnetic conductors, and a plurality of teeth and slots in the circumferential direction,
wherein the modular stator comprises at least one module, each of the at least one module formed between two circumferentially adjacent non-magnetic conductor distributed along the circumference;
the slots closest to both sides of the non-magnetic conductor are shifting circumferentially away from the non-magnetic conductor;
the rotor includes rotor iron core, flux barriers and permanent magnets;
the flux barrier angles are different in each pole and the flux barrier angles of adjacent poles are also different; and
the permanent magnets are inserted in the flux barriers and the N poles and the S poles of the permanent magnets adjacent in the circumferential direction are alternately arranged; and wherein slots a slots b are configured as closest to both sides of the non-magnetic conductor, and comprise different shifting angles, and wherein the remaining slots have the same slot spacing.

2. The fault-tolerant module PMaSynRM of claim 1, wherein each modular is connected by a separate three-phase distributed winding, wherein said three-phase distributed winding comprises a single layer or a double layer.

3. The fault-tolerant module PMaSynRM of claim 1, wherein the clockwise flux barrier angles along the reference module are $$\beta+\theta, \beta+2\theta \ldots \beta+\frac{n-1}{2}\theta,$$

the counterclockwise flux barrier angles along with the reference module:

$$\beta+\theta, \beta+2\theta \ldots \beta-\frac{n-1}{2}\theta,$$

p=n, when the number of rotor poles pair p is an odd number and the flux barrier angle β of any modular is selected as the reference, and wherein the clockwise flux barrier angles along the reference module are $$\beta+\theta, \beta+2\theta \ldots \beta+\left(\frac{n}{2}-1\right)\theta, \beta, \beta-\theta, \beta-2\theta \ldots \beta-\left(\frac{n}{2}-1\right)\theta,$$

p=n, when the number of rotor poles pair p is an even number.

4. The fault-tolerant module PMaSynRM of claim 1, wherein the shifting angles of slot a and slot b are $\theta_1$ and $\theta_2$, and wherein the specific values of $\theta_1$ and $\theta_2$ are set to 2.2 degrees and 2 degrees, respectively.

5. A method for a modular winding design in the fault-tolerant modular PMaSynRM comprises the following steps:
Step 1: Providing the fault-tolerant modular PMaSynRM comprising a modular stator and an asymmetric rotor, wherein the modular stator includes a stator iron core, armature windings, non-magnetic conductors and a plurality of teeth and slots in the circumferential direction, and wherein wherein the modular stator comprises at least one module, each of the at least one module formed between circumferentially adjacent non-magnetic conductor distributed along the circumference;

the slots closest to both sides of the non-magnetic conductor are shifting circumferentially away from the non-magnetic conductor;

the rotor includes rotor iron core, flux barriers and permanent magnets;

the flux barrier angles are different in each pole and the flux barrier angles of adjacent poles are also different; and the permanent magnets are inserted in the flux barriers and the N poles and the S poles of the permanent magnets adjacent in the circumferential direction are alternately arranged;

Step 2: Selecting the appropriate number of modules according to the numbers of slots and poles of the PMaSynRM with distributed winding, wherein the number of stator slots contained in each module is greater than or equal to 2 m, m≥3;

Step 3: Splitting the windings based on the slot electrical potential star vectogram, wherein each module is guaranteed to have an independent set of windings and the set of windings only uses stator slots in the same module, and wherein in order not to change the winding factor of the motor, the winding pitch is the same as the conventional connection and the left and right relative distribution will be adopted on the winding connection; and Step 4: Inserting the non-magnetic conductors between the modules to achieve isolation in order to realize the modular design of the motor stator.

6. The method for a modular winding design in the fault-tolerant modular PMaSynRM of claim 5, wherein each modular is connected by a separate three-phase distributed winding, wherein said three-phase distributed winding comprises a single layer or a double layer, and wherein the modular winding is connected based on the slot electrical potential star vectogram.

7. The method for a modular winding design in the fault-tolerant modular PMaSynRM of claim 5, wherein the integer slot distributed winding is adopted in the PMaSynRM, and the relationship of slot and pole satisfies q=S/(2*p*m) and q is an integer, wherein S is the number of stator slots, and p is the number of pole pairs, m≥3.

8. The method for a modular winding design in the fault-tolerant modular PMaSynRM of claim 5, wherein the clockwise flux barrier angles along the reference module are $$\beta+\theta, \beta+2\theta \ldots \beta+\frac{n-1}{2}\theta,$$

the counterclockwise flux barrier angles along with the reference module:

$$\beta+\theta, \beta+2\theta \ldots \beta-\frac{n-1}{2}\theta,$$

p=n, when the number of rotor poles pair p is an odd number and the flux barrier angle β of any modular is selected as the reference, and wherein the clockwise flux barrier angles along the reference module are $$\beta+\theta, \beta+2\theta \ldots \beta+\left(\frac{n}{2}-1\right)\theta, \beta, \beta-\theta, \beta-2\theta \ldots \beta-\left(\frac{n}{2}-1\right)\theta,$$

p=n, when the number of rotor poles pair p is an even number.

* * * * *